Figure 4:
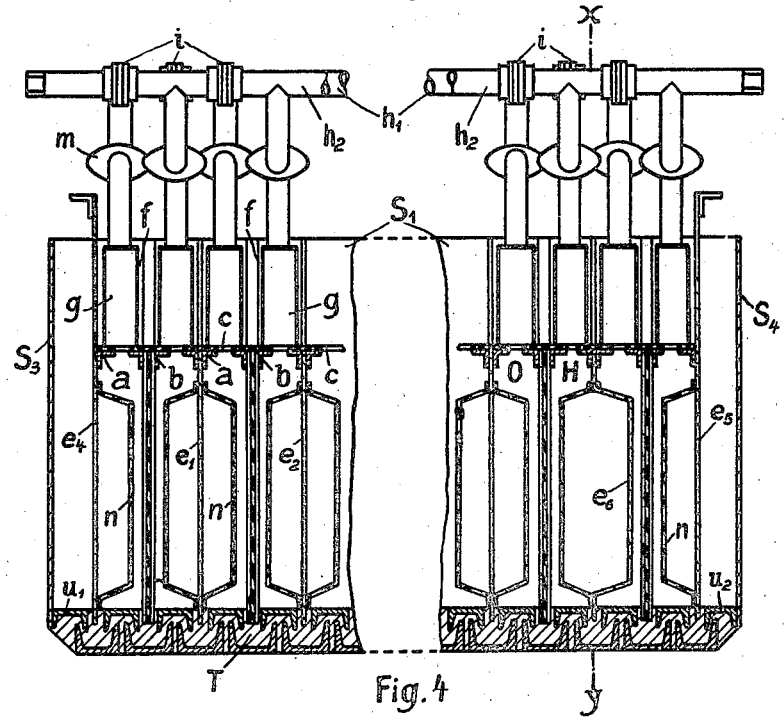

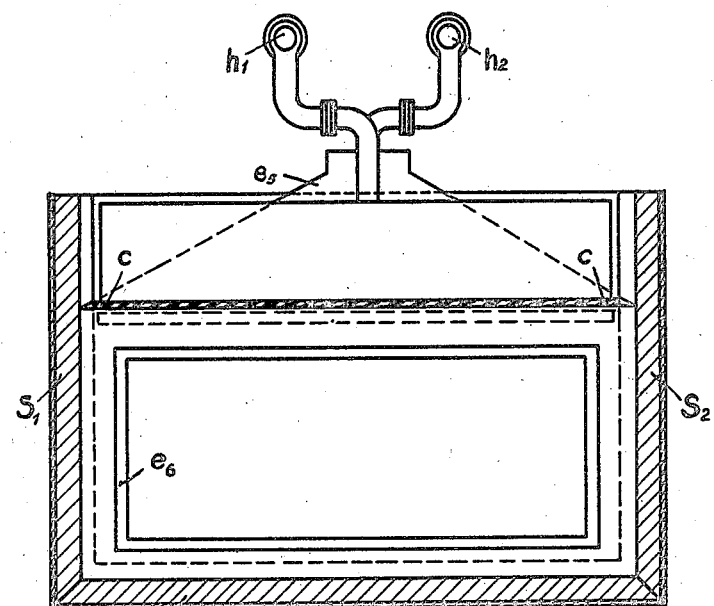
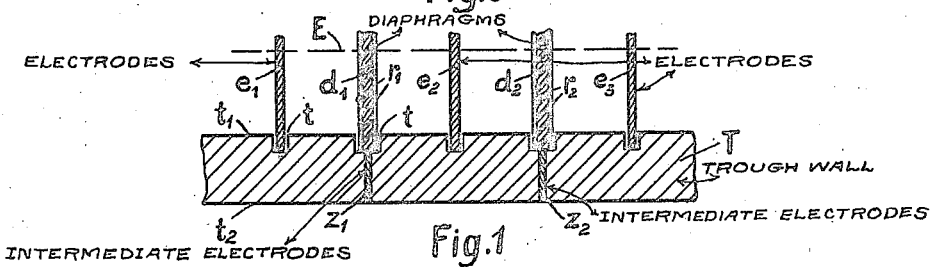
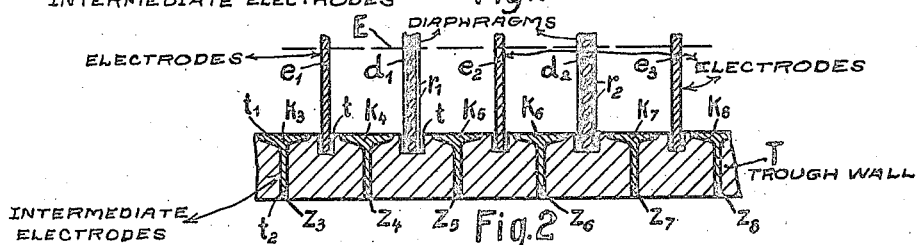
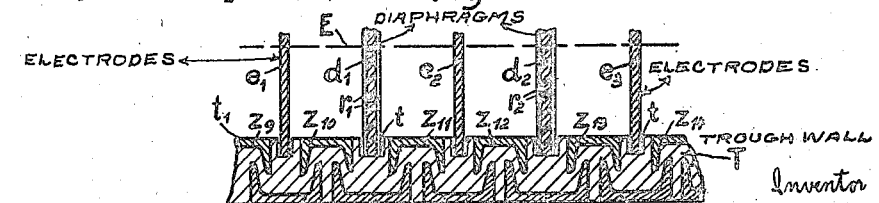

Patented Mar. 30, 1926.

1,579,138

UNITED STATES PATENT OFFICE.

FRANZ PETZ, OF NUREMBERG, GERMANY, ASSIGNOR TO ELEKTRIZITÄTS-AKTIEN-GESELLSCHAFT VORMALS SCHUCKERT & CO., OF NUREMBERG, GERMANY, A GERMAN CORPORATION.

ELECTROLYTIC CELL.

Application filed July 18, 1924. Serial No. 726,916.

*To all whom it may concern:*

Be it known that I, FRANZ PETZ, a citizen of the German Empire, residing at Nuremberg, Germany, have invented certain new and useful Improvements in Electrolytic Cells, of which the following is a specification.

My invention relates to improvements in electrolytic cells the troughs of which are constructed of cement.

In an electrolytic cell with bipolar electrodes or electrodes connected in series the electrical energy is consumed at low current intensity and high voltage, while a cell with unipolar electrodes or electrodes connected in parallel consumes the same amount of electrical energy at low voltage and correspondingly high current intensity. This is an essential advantage in favor of the series connection. The conductors can be made thinner and thus less expensive and the generator also becomes cheaper in first cost and in operation.

This advantage is utilized in the known cells which are constructed on the principle of a filterpress. In the operation of such cells breakdowns in consequence of the loosening of the packings between the electrode plates are, however, not infrequent. This construction has, furthermore, the disadvantage, that when a broken diaphragm is to be replaced it is necessary to dismantle the entire cell. These disadvantages would be avoided, if it were possible to connect in series plate-shaped electrodes arranged side by side in a trough, tank or vat, as in the case of the parallel connection. This arrangement has already been suggested but never been commercially employed so far as I am aware. The chief obstacle does not reside in the fact that a part of the current which is supplied to one end electrode and discharged from the other end electrode flows around the intermediate electrodes and thus does not take part in the electrolytic work, because this loss of current can be reduced to a negligible value. The obstacle rather resides in the difficulty of finding a suitable material for the construction of the trough, tank or vat. The trough must not conduct the electric current and hot lye, the usual electrolyte which would suggest itself immediately, should not attack it chemically. A further requirement is that the construction material of the vat should be inexpensive. India-rubber and in particular vulcanite, the only material which would fulfil the two first conditions, is too expensive. Cement has therefore been suggested as construction material for the trough or container.

The object of my invention is to overcome in using cement troughs the obstacles above pointed out and thus to render the trough cell with electrodes connected in series available for commercial use. The broad idea underlying the invention is to embed in a material, which is of low electric conductivity when wetted with the electrolyte, and which is chemically impervious to the electrolyte and which is at two places in contact with metal parts of the cell circuit at different potentials, at least one metallic layer in such a manner, that it forms in the material an intermediate or auxiliary electrode between the above mentioned metal parts of the cell circuit. The object of this intermediate electrode is that it should become polarized and that the counter-electromotive force of polarization, which opposes the impressed voltage, should prevent the passage of the current through the material or at least reduce it to a value which is no longer detrimental. That this action really takes place has been proved by extensive tests of the hereafter described cell, the trough of which is constructed of cement with intermediate or auxiliary electrodes of iron.

The drawings affixed to this specification and forming part thereof show in:—

Fig. 1, a portion of the wall of a trough as well as portion of some electrodes and diaphragms in cross-section.

Figure 5:
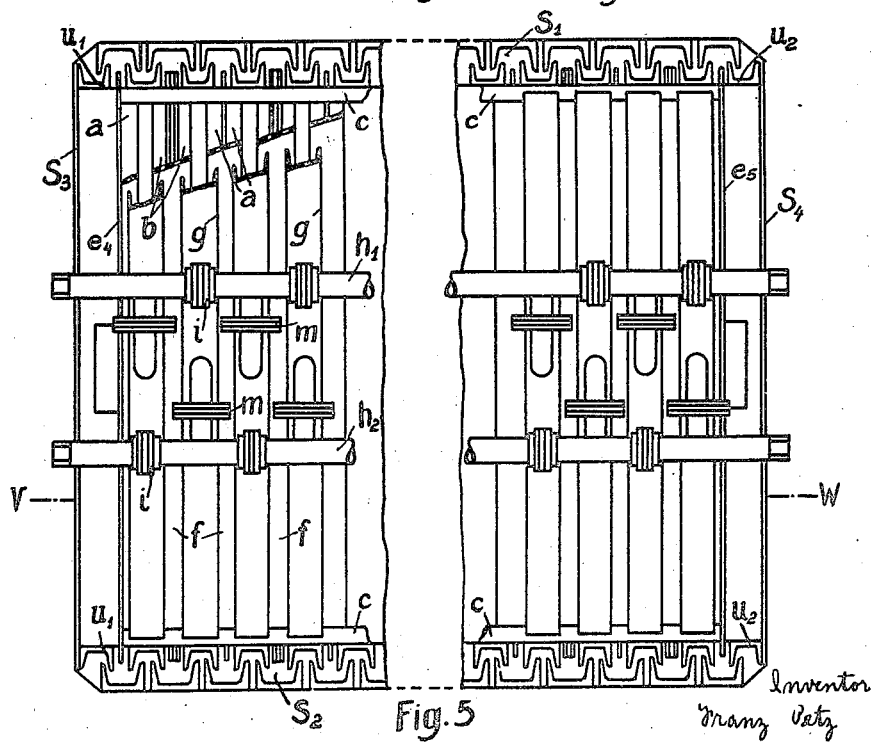

Fig. 2, a similar view of a modified construction of trough,

Fig. 3, a similar view of still another construction,

Fig. 4, a complete cell with a trough constructed according to Fig. 3 and having an internal construction, adapted to it the cell being shown, in vertical section along line V—W of Fig. 5, Fig. 5, a plan view of the modification shown in Fig. 4, with certain parts broken away to show certain internal parts of the cell and Fig. 6 a vertical section along line X—Y of Fig. 4.

Similar parts are indicated by the same reference characters in all figures of the drawings.

Referring to Figures 1-3, T is the wall of the trough, $e_1$, $e_2$, $e_3$ are the working electrodes, $d_1$, $d_2$ the diaphragms in metal frames $r_1$, $r_2$. The electrodes and diaphragm frames fit as accurately as possible into grooves $t$ of the inner surface $t_1$ of the wall of the trough. They dip into the electrolyte E which wets the inner surface of the walls of the trough.

Referring to Fig. 1, it will be seen that iron sheets $z_1$, $z_2$ are embedded in the wall of the trough as intermediate electrodes and extend from the bottom of the grooves for the diaphragms up to the outer surface $t_2$ of the wall of the trough.

Referring to Fig. 2 it will be seen that T-irons $z_3$ to $z_6$ are embedded in the wall of the trough as intermediate or auxiliary electrodes. They are disposed between two adjacent grooves $t$, reach with their webs up to the outer surface $t_2$ of the wall of the trough and form with their heads $k_3$ to $k_8$ an iron armor for the larger portion of the inner surface $t_1$, which protects the non-metallic portion (the cement) of the wall of the trough against the action of the electrolyte and leaves it uncovered only in the immediate vicinity of the grooves $t$. This iron armor must not come into metallic contact with the electrodes $e_1$, $e_2$, $e_3$. It may metallically touch the frames $r_1$, $r_2$ of the diaphragms $d_1$, $d_2$, but only so that the frames of the diaphragms produce no metallic connections between the adjacent heads of the intermediate electrodes. Of the heads $k_4$ and $k_5$, for instance, only one may touch the frame $r_1$ of the diaphragm $d_1$.

Referring to Fig. 3, it will be seen that two rows of U-irons are disposed in the wall of the trough as intermediate or auxiliary electrodes. The U-irons of the inner row, $z_9$ to $z_{14}$, are also disposed with their webs at the inner face $t_1$ of the wall of the trough and thus at the same time form an iron armor. The U-irons of the outer row $z_{15}$ to $z_{10}$, are situated with their webs at the outer face $t_2$ of the wall of the trough. The sides of the U-irons extend into the wall and each U-iron of one row reaches with its sides into the channel of two U-irons of the other row, so that the U-irons engage each other in the manner of chain links. The irons make, however, nowhere metallic contact with one another and all the interstices between them are filled with cement.

In order to make the manner of operation of the intermediate or auxiliary electrodes clear, it will be assumed that between the working electrodes from $e_1$ to $e_2$ and from $e_2$ to $e_3$ the potential drops by 2.4 volts each. Each of these electrodes is thus cathode on the left-hand side and anode on the right-hand side. The voltage of decomposition, i. e., the sum of the electromotive forces of the polarization at one anode surface and the opposite cathode surface may be assumed to be 1.7 volts, so that the voltage drop in the electrolyte between adjacent working electrodes amounts to 0.7 volts. These values hold good for iron electrodes in hot sodium lye with the electrodes a few centimetres apart and a load of about 10 amps. per square decimeter electrode surface.

When in the arrangement according to Fig. 1 voltage is applied in this manner, a current will in the first moment flow from the lower edge of the electrode $e_1$, which engages the groove in the trough, through the wall of the trough to the lower edge of the electrode $e_2$. For driving this current through the wall of the trough an E. M. F. of 0.7 volt only is available, because the polarization of the working electrodes consumes already 1.7 volts of the 2.4 volts of the electrode voltage. The current originally passing through the wall of the trough also polarizes, however, the intermediate electrode $Z_1$ and the growing counter E. M. F. of this polarization gradually consumes the impressed voltage of 0.7 volt so that the current disappears altogether. The voltage between the electrodes $e_1$ and $e_2$ would have to be increased to more than double the decomposition voltage, i. e., to more than 3.4 volts, if a current should be able to flow continually through the wall of the trough. This also holds good for the intermediate electrode $Z_2$ and for each of the other electrodes arranged according to Fig. 1.

In the construction of the cell according to Fig. 2 two intermediate electrodes are arranged one behind the other between any two working electrodes, as for instance the intermediate electrodes $Z_4$ and $Z_5$ between the working electrodes $e_1$ and $e_2$. Here the safety against the passage of the current through the wall is still further increased, because more than three times the decomposition voltage, i. e., 5.1 volts, would be required between the electrodes $e_1$, $e_2$ in order to drive continually a current from the electrode $e_1$ through the wall of the trough to the electrode $e_2$. This arrangement also offers the advantage, that the cement of the wall of the trough is less exposed to the attack of the electrolyte, than in the construction according to Fig. 1.

In the construction according to Fig. 3 three current paths connected in parallel are imaginable in the wall of the trough. The first passes from the electrode $e_1$ across the U-iron $z_{10}$ and $z_{11}$ of the inner row to the electrode $e_2$, the second from the electrode $e_1$ across the iron $z_{15}$, $z_{16}$, $z_{17}$ to electrode $e_2$ and the third from the electrode $e_1$ in meandric windings through the cement between the U-irons to the electrode $e_2$. This holds good for any pair of working electrodes.

The first two paths are blocked in the described manner by the E. M. F. of polarization, but along the third path a current is able to flow continually. This current is, however, weak and harmless, because 0.7 volt is only available as propelling force and the path is long and its cross-sectional area small.

It is, furthermore, possible also to block the third path for the current, if a sheet of iron is embedded in the wall of the trough between two adjacent U-irons of the outer row, which sheet extends from the outer face of the wall to the web of the U-iron of the inner row. A sheet of iron embedded between the outer U-irons $z_{16}$ and $z_{17}$, for instance, would have to extend up to the web of the inner U-iron $z_{11}$.

The construction according to Fig. 3 offers a further advantage, if cement is employed as filling material between the U-irons. In the spaces between the irons the cement which expands on setting, is subjected to strong pressure with the result that its structure becomes very dense and the wall does not leak. It is well known that it is extremely difficult to construct containers of cement or concrete which remain tight under liquid pressure and this difficulty is effectively overcome by the construction of the wall of the container according to Fig. 3. This manner of construction is therefore also of importance for vessels which serve other than electrolytic purposes.

In the cell illustrated in Figs. 4 to 6, the bottom and the two side walls $s_1$ and $s_2$ of the trough are constructed according to Fig. 3. The U-irons of the bottom and the side walls of the trough which belong together are welded together to form frames of the rectangular shape shown in Fig. 4. In order to construct the trough these frames are arranged properly spaced within a mould and the cement is then poured into the mould. The ends $s_3$ and $s_4$ of the trough consist of sheet iron and are welded to the frames formed by the outermost members $u_1$ and $u_2$ of the inner row of U-irons.

The inner faces of the side walls are provided with vertical grooves which form continuations of the grooves in the bottom of the trough. Into these grooves are inserted from the top the working electrodes and the frames of the diaphragm. In the cell illustrated this also holds good for the end electrodes $e_4$ and $e_5$. It would, however, be possible to employ the metallic end walls $s_3$, $s_4$ of the trough as electrodes.

A special feature of the cell illustrated is the manner of supporting the gas collecting bells $g$. They rest upon sills $a$ at the front edges of the working electrodes and on sills $b$ at the front sides of the frames of the diaphragms. These sills are covered with a layer of a resilient insulating and packing material, for instance an asbestos fabric. At the inner faces of the side walls $S_1$, $S_2$ the spaces between the sills are bridged over by strips $c$ of insulating or packing material, which fit closely the wall of the trough and obstruct the escape of the gases through the interstices between the wall of the trough and the gas collecting bells. For each working electrode face an individual gas collecting bell is provided. Between adjacent bells spaces $f$ are left, in order to conduct gas which may have escaped from a bell into the atmosphere and so to prevent its entering the adjacent bell. The bells are alternately connected with one of the two collecting pipe lines $h_1$, $h_2$. Into these pipe lines are inserted insulators $i$ between any two adjacent connecting places, which prevent the current from passing through the gas collecting pipes. The connecting pipes of the bells are made in two parts and by loosening a flange connection $n$ between these parts each bell can be disconnected from the collecting pipe line. The pipe lines are so constructed that after the removal of one or more bells each electrode and each diaphragm can easily be lifted out of the cell.

The total number of the gas collecting bells is in each cell equal to the number of the U-irons of the inner row between the end electrodes $e_4$, $e_5$ embedded in the wall of the trough. If the gas collecting bells consist of metal, although they could also be made of insulating material, they form in the electrolyte over the sills of the working electrodes and diaphragms intermediate electrodes between the end electrodes. Their electromative forces of polarization prevent the passage of the current through the layers of the electrolyte which are situated between the collecting bells. Within the reach of the bells the current can only pass through the gap between the bells and the side walls of the trough and thus get lost for the electrolysis. This loss may, however, be avoided entirely by providing a packing between the bells and the side walls of the trough. The bells may be in metallic contact with the U-iron of the inner row embedded in the wall of the trough between the sides of which it is situated, as these parts assume the same potential during the operation.

To the electrodes preforated iron sheets $n$ are welded. These sheets are in front of the sheets which must act as gas-proof partition walls. The active surface of the electrodes is increased in this way and the resistance which the current finds in the electrolyte is reduced.

In this cell all chambers or compartments formed by an electrode plate, a diaphragm, the wall of the trough and a gas collecting bell have an equal cubic capacity. For a test one of the electrodes of such a cell was given the convexity shown in Fig. 4 at $e_6$ in order to make the cubic capacity of the hydrogen compartment H larger than the capacity of the oxygen compartment O. Hereby not only a greater yield of hydrogen gas, but also a greater purity of the oxygen gas in the collecting chamber H and O was attained. The inferior effect with both chambers of equal capacity is accounted for by the fact, that owing to the unequality of the volumes of hydrogen and oxygen gas, which mix in the form of minute bubbles with the electrolyte and thereby result in mixtures of unequal density, the level of the electrolyte in the chamber H rises higher than in the chamber O with the result that the electrolyte flows through the interstices between the gas collecting bells and the sill upon which they rest from the chamber H into the chamber O. The hydrogen chambers should have approximately double the cubic capacity as the oxygen chamber. This may be attained with electrodes which are laterally arched or made convex like the electrode $e_6$ in Fig. 4. The diaphragms may equally well be laterally displaced in relation to the grooves in which their frames are inserted, by constructing their frames of Z-irons. Furthermore, the electrode plates and the diaphragms with their frames may be constructed as in the described cell, but the pitch of the grooves in the wall of the trough may be changed in such manner that the distance between the electrode plate and diaphragm is greater on the electrode side than on the oxygen side. U-irons of different sections would then be employed for the inner and the outer series in the wall of the trough.

The profile iron of which the wall of the trough is constructed need not necessarily be produced by rolling. They may equally well be bent from strips or iron, particularly in the case of small troughs.

For relatively large troughs, for instance such which are intended for the reception of electrodes of standard sheet iron sizes, the employment of rolled profile stock is, however, recommended in order to give the trough the necessary strength and to render special reinforcement for the bottom and the side walls unnecessary.

It may be pointed out that the described trough although it is primarily constructed for a cell with electrodes connected in series may also be employed for a cell with electrodes connected in parallel. The internal construction of the cell according to Figures 4 to 6 would be only slightly changed, if the cell is to be converted for parallel connection. The working electrodes situated between the end electrodes $e_4$, $e_5$ of the cell illustrated must be fitted with current conductors adapted to to led out of the trough near the groove in the side walls. The two gas collecting bells resting upon the same working electrode might be combined into a single one. The connection of the bells with the collecting pipe line would have to be correspondingly modified.

As non-metallic constituent for the walls of the trough or vat Portland cement has up to now been assumed. It is, however, obvious that any other poorly conducting or non-conducting material which is sufficiently impervious to the electrolyte and which can be moulded and which combines with metal, in particular with iron, may be employed instead of Portland cement and the term cement must be understood to comprise all such materials. It would also be possible to embed filling materials, such as lime gravel, in the cement in order to cheapen the manufacture of the trough.

What I claim as my invention and desire to secure by Letters Patent is:—

1. In an electrolytic cell in combination, a trough partly consisting of cement and adapted to contain an electrolyte, a series of plate shaped working electrodes in said trough spaced a suitable distance apart, each plate contacting with the trough bottom and with two opposite side walls thereof, means for connecting a current source to the first and the last working electrode, means for collecting and removing the gases forming at the working electrodes, and a series of intermediate electrodes embedded in the trough bottom and in said opposite side walls, and being suitably spaced with relation to said working electrodes so that at least one intermediate electrode is disposed between each adjacent part of working electrodes.

2. In an electrolytic cell in combination, a trough partly consisting of cement and adapted to contain an electrolyte, a series of plate shaped working electrodes in said trough spaced a suitable distance apart, each plate contacting with the trough bottom and with two opposite side walls thereof, a series of diaphragms spaced apart in said trough and individually alternating with said working electrodes, means for connecting a current source to the first and the last electrode, means for collecting and removing the gases forming at the working electrodes, and a series of intermediate electrodes embedded in the trough bottom and in said opposite side walls and being suitably spaced with relation to said working electrodes so that at least one intermediate electrode is disposed between each working electrode and an adjacent diaphragm.

3. In an electrolytic cell in combination, a trough partly consisting of cement and adapted to contain an electrolyte, a series of plate shaped working electrodes in said trough spaced a suitable distance apart, each plate contacting with the trough bottom and with two opposite side walls thereof, means for connecting a current source to the first and the last working electrode, means for collecting and removing the gases forming at the working electrodes, and a series of intermediate electrodes embedded in the trough bottom and in said opposite side walls, and being suitably spaced with relation to said working electrodes so that at least one intermediate electrode is disposed between each adjacent part of working electrodes, said intermediate electrodes having laterally extending heads which are flush with the inside trough surface and which cover said surface, except for narrow strips remaining along the lines of contact of the working electrodes with the trough surfaces.

4. In an electrolytic cell in combination, a trough partly consisting of cement and adapted to contain an electrolyte, a series of plate shaped working electrodes in said trough spaced a suitable distance apart, each plate contacting with the trough bottom and with two opposite side walls thereof, a series of diaphragms spaced apart in said trough and individually alternating with said working electrodes, means for connecting a current source to the first and the last electrode, means for collecting and removing the gases forming at the working electrodes, and a series of intermediate electrodes embedded in the trough bottom and in said opposite side walls and being suitably spaced with relation to said working electrodes so that at least one intermediate electrode is disposed between each working electrode and an adjacent diaphragm, said intermediate electrodes having laterally extending heads, which are flush with the inside trough surface and which cover said surface except for narrow strips remaining along the lines of contact of the working electrodes and the diaphragms with the trough surfaces.
5. In an electrolytic cell in combination, a trough partly consisting of cement and adapted to contain an electrolyte, a series of plate shaped working electrodes in said trough spaced a suitable distance apart, each plate contacting with the trough bottom and with two opposite side walls thereof, a series of diaphragms individually alternating with said working electrodes, means for connecting a current source to the first and the last working electrode, means for collecting and removing the gases forming at the working electrodes, an inner series of U-profiled iron elements, one element being disposed between each working electrode and an adjacent diaphragm, and each element being embedded in the bottom and the side walls of the trough with its web flush with the inner trough surface and with its shanks extending into the cement, an outer series of U-profiled iron elements embedded in the trough bottom and said side walls with their web flush with the outer trough surface and with their shanks extending into the cement, the iron elements of the outer series being laterally transposed relatively to those of the inner series so that two adjacent shanks of adjacent elements of one series extend freely between the shanks of an oppositely disposed element of the other series.

6. In an electrolytic cell in combination, a trough partly consisting of cement and adapted to contain an electrolyte, a series of plate shaped working electrodes in said trough spaced a suitable distance apart, each plate contacting with the trough bottom and two opposite side walls thereof, a series of diaphragms spaced apart in said trough and individually alternating with said working electrodes, the height of said electrodes and said diaphragms being smaller than the trough height, means for connecting a current source to the first and the last electrode, a series of intermediate electrodes embedded in the trough bottom and in said opposite side walls and being suitably spaced with relation to said working electrodes so that at least one intermediate electrode is disposed between each working electrode and an adjacent diaphragm, a series of gas collecting bells, each bell having a gas discharge tube, said bell series being spaced apart in the upper trough portion, so that one bell is located above each cell chamber formed by a working electrode, an adjacent diaphragm and the two opposite trough walls, and layers of insulating material disposed between the lower bell rims and the upper rims of their pertaining working electrode and diaphragm.

7. In an electrolytic cell in combination, a trough adapted to contain an electrolyte and partly consisting of a material electrically conductive when wetted by the electrolyte, a series of plate shaped working electrodes in said trough spaced a suitable distance apart, each plate contacting with the trough bottom and with two opposite side walls thereof, means for connecting a current source to the first and the last working electrode, means for collecting and removing the gases forming at the working electrodes, and a series of intermediate electrodes embedded in the trough bottom and in said opposite side walls, and being suitably spaced with relation to said working electrodes so that at least one intermediate electrode is disposed between each adjacent part of working electrodes.

In testimony whereof I affix my signature.

FRANZ PETZ.